United States Patent [19]
Ikeda et al.

[11] Patent Number: 6,001,472
[45] Date of Patent: Dec. 14, 1999

[54] CLEANING SHEET FOR PRINTING APPARATUS

[75] Inventors: Atsushi Ikeda, Fujisawa, Japan; Nobuhiro Yoshikawa, Aliso Viejo, Calif.

[73] Assignee: No Touch North America, Lake Forest, Calif.

[21] Appl. No.: 09/178,245

[22] Filed: Oct. 23, 1998

Related U.S. Application Data

[62] Division of application No. 08/912,595, Aug. 18, 1997, Pat. No. 5,891,259.

[51] Int. Cl.[6] .................................................. B32B 7/12
[52] U.S. Cl. ..................... 428/343; 428/214; 428/317.1; 428/317.3; 428/317.5; 428/317.7; 428/354; 134/6; 15/104.002
[58] Field of Search ...................... 15/104.002; 428/214, 428/317.1, 317.3, 317.5, 317.7, 354, 343; 134/6

[56] References Cited

U.S. PATENT DOCUMENTS

| | | | |
|---|---|---|---|
| 2,269,712 | 1/1942 | Drew | 91/68 |
| 3,864,993 | 2/1975 | Hovind | 81/3 R |
| 4,046,468 | 9/1977 | Stryewski | 355/3 R |
| 4,510,640 | 4/1985 | Omori | 15/104 |
| 4,713,274 | 12/1987 | Minor | 428/40 |
| 4,718,489 | 1/1988 | Ohkubo et al. | 355/3 FU |
| 4,742,483 | 5/1988 | Morrell | 364/900 |
| 4,837,062 | 6/1989 | Dunshee et al. | 428/41 |
| 4,873,548 | 10/1989 | Kobayashi et al. | 355/200 |
| 5,138,390 | 8/1992 | Miyabayashi et al. | 355/283 |
| 5,227,844 | 7/1993 | Bhattacharjee et al. | 355/215 |
| 5,334,447 | 8/1994 | Kitamura et al. | 428/317.3 |
| 5,401,111 | 3/1995 | Nubson et al. | 400/701 |
| 5,407,489 | 4/1995 | Hoover | 134/6 |
| 5,423,411 | 6/1995 | Kennett | 198/494 |
| 5,457,843 | 10/1995 | Gelardi et al. | 15/229.12 |
| 5,649,130 | 7/1997 | Nakajima et al. | 399/327 |
| 5,690,749 | 11/1997 | Lee | 134/6 |

FOREIGN PATENT DOCUMENTS

| | | | |
|---|---|---|---|
| 0203640 | 3/1986 | European Pat. Off. | G03G 15/20 |
| 0281372 | 7/1988 | European Pat. Off. | G03G 15/00 |
| 2064559 | 12/1970 | Honduras . | |
| 60196787 | 10/1985 | Japan | G03G 15/20 |
| 2071575 | 9/1981 | United Kingdom | G03G 21/00 |

*Primary Examiner*—Helen L. Pezzuto
*Assistant Examiner*—Arti R. Singh
*Attorney, Agent, or Firm*—Stetina Brunda Garred & Brucker

[57] ABSTRACT

A cleaning device and methodology therefor for cleaning a paper path surface upon which paper travels within a printing apparatus such as a computer printer, a photocopy machine, a fax machine, and the like. The cleaning device is a flexible substrate sheet having a first side and a second side, with the first side coated preferably in its entirety with an exposed adhesive having a tack strength between about 0.0002 and about 0.12 pound force-square inch. The second side of the substrate sheet can have laminated thereto a foam resin to provide a flexible thickness that assures pressured contact with all paper path surfaces to be cleaned. A lint-free cloth layer can be laminated to the foam resin if present, or the cloth layer can be laminated directly to the second surface of the sheet substrate. operability occurs as the substrate sheet is fed into the printing apparatus and travels there through along the paper-path surfaces upon which paper is conveyed. of particular importance is the cleaning of rubber paper-feed rollers within printing equipment and whose surfaces can have accumulated thereupon paper powder, color pigment, dust, ink, toner, etc.

16 Claims, 1 Drawing Sheet

CLEANING SHEET FOR PRINTING APPARATUS

This application is a division of Ser. No. 08/912,595 now U.S. Pat. No. 5,891,259.

FIELD OF THE INVENTION

The present invention relates in general to the cleaning of printing apparatus such as a desk-top printer, and in particular to an adhesive coated sheet that cleans paper path surfaces as the sheet travels through the apparatus.

BACKGROUND OF THE INVENTION

Printing equipment, including desk-top printers used in association with computer print-out material from word processing, spread sheet preparation, and the like, becomes dirty over a period of use as paper path surfaces collect random image-forming particles, dust, paper residue, etc. This build-up of particulate can cause reduced-quality printing as well as harm to the equipment itself, and therefore necessitates a maintenance program that includes periodic cleaning of rollers and other printer components that come into contact with the sheets of paper upon which images are printed.

One typical manner of cleaning such printing equipment is to introduce a tissue paper having absorbed therein a liquid solvent such as an alcohol for dissolving particulate. This procedure is followed by wiping and drying the cleaned components for subsequent operation of the equipment. Another manner of cleaning paper paths is to provide a sheet having an extremely aggressive adhesive coating that must be maintained behind a liner until the sheet is used. The aggressiveness of this adhesive is so great that the leading edge of the sheet cannot have adhesive there applied because jamming of the printing apparatus would result when the sheet is introduced to the paper path. Further, of course, the presence of a liner and its required removal results in inefficient operation as well as waste of materials. As is therefore evident, both of these procedures are inconvenient, time-consuming, and potentially messy, and make apparent the presence of a need for a cleaning device that can routinely effectively and efficiently clean the paper path surface of the printing equipment. Accordingly, a primary object of the present invention is to provide a cleaning device that can clean the surfaces of a paper path directly and without hardship.

Another object of the present invention is to provide a cleaning device constructed as a flexible sheet that can be fed directly into printing equipment as would be fed a sheet of paper.

Yet another object of the present invention is to provide a cleaning device wherein an adhesive is coated on a flexible sheet for removing foreign matter from the paper-path components of the printing equipment.

These and other objects of the present invention will become apparent throughout the description thereof which now follows.

SUMMARY OF THE INVENTION

The present invention is a cleaning device and methodology therefor for cleaning a paper path surface upon which paper travels within a printing apparatus such as a computer printer, a photocopy machine, a fax machine, and the like. The cleaning device comprises a flexible substrate sheet having a first side and a second side, with the first side coated preferably in its entirety with an exposed adhesive having a tack strength between about 0.0002 and about 0.12 pound force-square inch. The second side of the substrate sheet can have laminated thereto a foam resin to provide a flexible thickness that assures pressured contact with all paper path surfaces to be cleaned. A lint-free cloth layer can be laminated to the foam resin if present, or the cloth layer can be laminated directly to the second surface of the sheet substrate.

Operability occurs as the substrate sheet is fed into the printing apparatus and travels there through along the paper-path surfaces upon which paper is conveyed. Because the adhesive has a relatively low tack strength, it is not inconveniently adherent to other items and therefore does not require a protective liner for storage and retrieval. Concurrently, this low tack strength substantially eliminates any jamming of the substrate sheet within the printing equipment, thereby also permitting full coverage of the surface of the substrate sheet since leading-edge engagement with paper-path surfaces likewise will not cause an entry jam. Of particular importance is the cleaning of rubber paper-feed rollers within printing equipment and whose surfaces can have accumulated thereupon paper powder, color pigment, dust, ink, toner, etc. Employment of a cleaning device according to the present invention effectively and efficiently removes such accumulations to thereby enable production of printed matter without extraneous and undesirable imprints.

BRIEF DESCRIPTION OF THE DRAWINGS

An illustrative and presently preferred embodiment of the invention is shown in the accompanying drawings in which.

DETAILED DESCRIPTION OF THE PREFERRED EMBODIMENT

Figure 1:
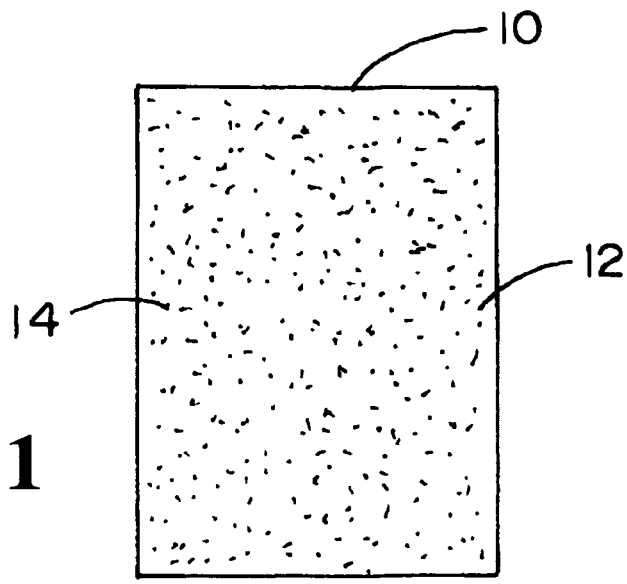
FIG. 1 is a top plan view of a substrate sheet having coated on its top surface an adhesive.

Referring to FIG. 1, a cleaning device comprising a substrate sheet 10 is shown with an adhesive 12 coated on substantially the entire top surface 14 thereof. The sheet 10 can be constructed of paper, such as bond, photocopy, kraft or synthetic paper, for example, or constructed of plastic film, such as polyethylene terephthalate (PET) film, for example. The adhesive has a tack strength between about 0.0002 and about 0.12 pound force-square inch, and can be a self adhesive resin such as non-limitedly exemplified in latex resin or silicone rubber resin, or it can be a pressure sensitive adhesive resin such as non-limitedly exemplified in liquid rubber resin, petroleum resin, or turpentine resin. As is apparent from the tack strength, the adhesive is relatively non-aggressive and therefore does not require a liner thereon for stacking and storage of the substrate sheet 10.

Figure 2:
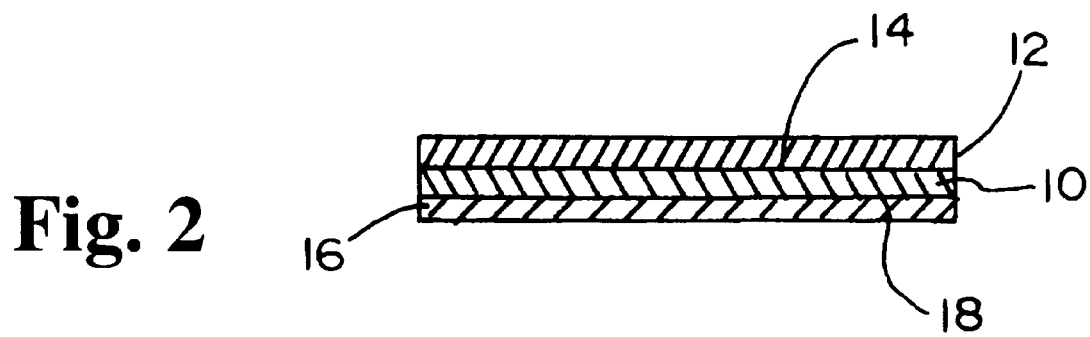
FIG. 2 is a side elevation view of a substrate sheet having coated on its top surface an adhesive and having laminated to its bottom surface a foam resin.
Figure 3:
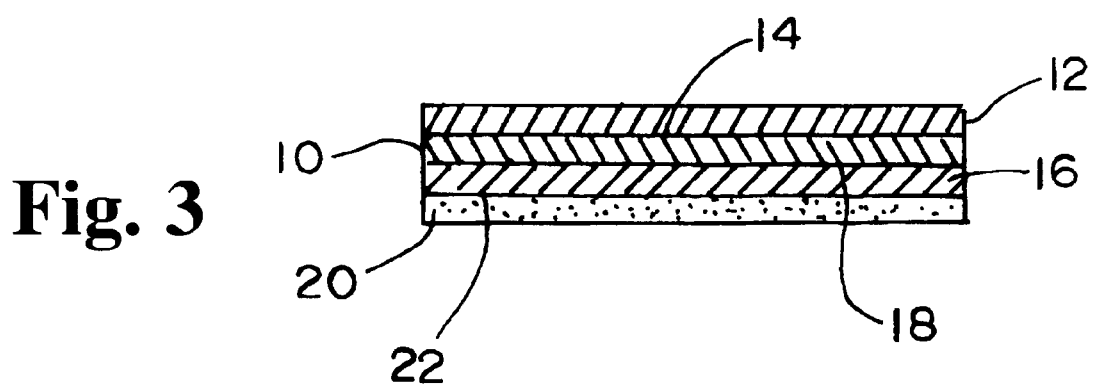
FIG. 3 is a side elevation view of the sheet of FIG. 2 having in addition a cloth layer laminated to the foam resin.

Referring to FIGS. 2 and 3, a substrate sheet 10 with adhesive 12 is shown having in addition a resin foam 16 laminated to substantially the entirety of the bottom surface 18 of the sheet 10. The resin foam 16 can be constructed of polyethylene, polypropylene or poylurethane, for example, and is provided to impart greater thickness and resiliency if needed to the sheet 10 for pressured application against a surface to be cleaned. Finally, a generally lint-free cloth layer 20 can be laminated to the exposed surface 22 of the resin foam 16. This cloth layer 20 also can be included without the presence of the resin foam 16, in which case the cloth layer 20 is laminated directly to the bottom surface 18 of the substrate sheet 10. Inclusion of a cloth layer 20 functions to provide additional structural integrity to the substrate sheet 10. A preferred dimension of the substrate sheet 10 is 8.5×11 inches, while preferred thicknesses of the components are as follows: substrate sheet 10—10–3,000 μm; adhesive—5–500 μm; resin foam 16—200–3,000 μm; cloth layer 20—200–3,000 μm.

Soil removal occurs as the substrate sheet is fed into the printing apparatus and travels there through along the paper-path surfaces upon which paper is conveyed, as especially exemplified by rubber rollers for paper feed. When a cleaning device of the present invention is inserted into a printing apparatus along the same path that paper to be printed travels, the device removes dirt by adhesion and static electricity as the device is moved by a roller. The examples that follow illustrate this efficacy.

EXAMPLES

In all of the examples reported below, comparative results were measured from data gathered using a Hewlett Packard Desk Jet 1200C printer from which 100 identical copies were generated on Hewlett Packard Inkjet paper. After each set of 100 copies was produced, cleaning occurred with results shown below in Table I. operating parameters that produced the results shown in Table I are recited under each Example. Tack strength throughout was from about 0.0002 to about 0.12 pound force-square inch.

Example 1

A cleaning device constructed of 100 μm thick photocopy paper and 50 μm thick self adhesive latex resin on the top surface of the paper was introduced to make a single pass through the printer.

Example 2

A cleaning device constructed of 60 μm thick PET film and 800 μm thick self adhesive silicone rubber resin on the top surface of the paper was introduced to make a single pass through the printer.

Example 3

A cleaning device constructed of 2,000 μm thick kraft paper and 10 μm thick pressure sensitive liquid rubber resin on the top surface of the paper was introduced to make a single pass through the printer.

Example 4

A cleaning device constructed of 150 μm thick white bond paper and 200 μm thick pressure sensitive petroleum resin on the top surface of the paper was introduced to make a single pass through the printer.

Example 5

A cleaning device constructed of 30 μm thick white bond paper and 100 μm pressure sensitive turpentine resin on the top surface of the paper was introduced to make a single pass through the printer.

Example 6

A cleaning device constructed of 100 μm thick photocopy paper and 50 μm thick self adhesive latex resin on the top surface of the paper and 1,000 μm thick polypropylene foam resin laminated to the bottom surface of the paper was introduced to make a single pass through the printer.

Example 7

A cleaning device constructed of 100 μm thick photocopy paper and 50 μm thick pressure sensitive liquid rubber resin on the top surface of the paper and 1,000 μm thick polypropylene foam resin laminated to the bottom surface of the paper was introduced to make a single pass through the printer.

Example 8

A cleaning device constructed of 200 μm thick kraft paper and 50 μm thick self adhesive latex resin on the top surface of the paper and 1,600 μm thick polypropylene foam resin laminated to the bottom surface of the paper was introduced to make a single pass through the printer.

Example 9

A cleaning device constructed of 60 μm thick PET film and 800 μm thick self adhesive silicone rubber resin on the top surface of the paper and 1,000 μm thick polypropylene foam resin laminated to the bottom surface of the paper was introduced to make a single pass through the printer.

Example 10

A cleaning device constructed of 100 μm thick photocopy paper and 500 μm thick self adhesive latex resin on the top surface of the paper and 200 μm thick rayon lint-free fabric laminated to the bottom surface of the paper was introduced to make a single pass through the printer.

Example 11

A cleaning device constructed of 200 tm thick kraft paper and 500 μm thick self adhesive silicone rubber resin on the top surface of the paper and 700 μm thick polyester lint-free fabric laminated to the bottom surface of the paper was introduced to make a single pass through the printer.

Example 12

A cleaning device constructed of 100 μm thick photocopy paper and 500 μm thick pressure sensitive liquid rubber resin on the top surface of the paper and 500 μm thick polyester/rayon fabric blend (50/50 wt. %) laminated to the bottom surface of the paper was introduced to make a single pass through the printer.

Example 13

A cleaning device constructed of 100 μm thick photocopy paper and 800 μm thick pressure sensitive petroleum resin on the top surface of the paper and 500 μm thick polypropylene lint-free fabric laminated to the bottom surface of the paper was introduced to make a single pass through the printer.

Example 14

A cleaning device constructed of 100 μm thick photocopy paper and 50 μm thick self adhesive latex resin on the top surface of the paper and 1,000 μm thick polyethylene foam resin laminated to the bottom surface of the paper was introduced to make a single pass through the printer.

Example 15

A cleaning device constructed of 60 μm thick PET film and 800 μm thick self adhesive silicone rubber resin on the top surface of the paper and 700 μm thick urethane foam resin laminated to the bottom surface of the paper was introduced to make a single pass through the printer.

Example 16

A cleaning device constructed of 100 μm thick photocopy paper and 50 μm thick self adhesive latex resin on the top surface of the paper and 700 μm thick polyester lint-free fabric laminated to the bottom surface of the paper was introduced to make a single pass through the printer.

Example 17

A cleaning device constructed of 60 μm thick PET film and 800 μm thick self adhesive silicone rubber resin on the top surface of the paper and 350 μm thick cotton lint-free fabric laminated to the bottom surface of the paper was introduced to make a single pass through the printer.

TABLE I

Results of Examples 1–17

| Example No. | Soil Removal | Ease of Operation | Product Safety |
| --- | --- | --- | --- |
| 1 | 4 | E | E |
| 2 | 5 | E | E |
| 3 | 5 | A | E |
| 4 | 4 | E | E |
| 5 | 5 | A | E |
| 6 | 5 | E | E |
| 7 | 5 | E | E |
| 8 | 5 | E | E |
| 9 | 5 | E | E |
| 10 | 5 | E | E |
| 11 | 5 | E | E |
| 12 | 5 | E | E |
| 13 | 5 | E | E |
| 14 | 5 | E | E |
| 15 | 5 | E | E |
| 16 | 5 | E | E |
| 17 | 4 | E | E |

Key: Soil Removal Ability 1~5 (5 being best)
E = Excellent; A = Adequate

As is apparent from the experimental results shown above, the cleaning device of the present invention effectively accomplishes soil removal from paper path surfaces in a printing apparatus as here exemplified by an ink jet printer while providing user-friendly operation and complete product safety. While an illustrative and presently preferred embodiment of the invention has been described in detail herein, it is to be understood that the inventive concepts may be otherwise variously embodied and employed and that the appended claims are intended to be construed to include such variations except insofar as limited by the prior art.

What is claimed is:

1. A cleaning device for cleaning a paper path surface upon which paper travels within a printing apparatus, the cleaning device comprising a flexible substrate sheet having a first side and a second side, with the first side coated with an exposed adhesive, said adhesive having a tack strength between about 0.0002 and about 0.12 pound force-square inch whereby the tack strength is not sufficient to cause jamming when the device is passed through the paper path.

2. A cleaning device as claimed in claim 1 wherein substantially the entire first side is coated with the adhesive.

3. A cleaning device as claimed in claim 1 wherein the adhesive is a self adhesive resin.

4. A cleaning device as claimed in claim 3 wherein the self adhesive resin is chosen from the group consisting of latex resin and silicone rubber resin.

5. A cleaning device as claimed in claim 1 wherein the adhesive is a pressure sensitive resin.

6. A cleaning device as claimed in claim 5 wherein the pressure sensitive resin is chosen from the group consisting of liquid rubber resin, petroleum resin, and turpentine resin.

7. A cleaning device as claimed in claim 1 wherein the flexible substrate sheet is chosen from the group consisting of paper and plastic film.

8. A cleaning device as claimed in claim 7 wherein the flexible substrate sheet has laminated to its second side a foam resin with an exposed surface.

9. A cleaning device as claimed in claim 8 wherein the foam resin is chosen from the group consisting of polyethylene, polypropylene and polyurethane.

10. A cleaning device as claimed in claim 8 wherein the foam resin has laminated to its exposed surface a generally lint-free cloth layer.

11. A cleaning device as claimed in claim 10 wherein the lint-free cloth layer is chosen from the group consisting of polyester fabric, rayon fabric, cotton fabric, and blends thereof.

12. A cleaning device as claimed in claim 1 wherein the flexible substrate sheet has laminated to its second side a foam resin having an exposed surface.

13. A cleaning device as claimed in claim 12 wherein the foam resin has laminated to its exposed surface a generally lint-free cloth layer.

14. A cleaning device as claimed in claim 1 wherein the flexible substrate sheet has laminated to its second side a generally lint-free cloth layer.

15. A cleaning device for cleaning a paper path surface upon which paper travels within a printing apparatus, the cleaning device comprising a flexible substrate sheet chosen from the group consisting of paper and plastic film and having a first side and a second side, with the first side coated with an exposed adhesive, said adhesive having a tack strength between about 0.0002 and about 0.12 pound force-square inch, and with the second side having laminated thereto a foam resin with an exposed surface to which exposed surface is laminated a generally lint-free cloth layer.

16. A cleaning device for cleaning a paper path surface upon which paper travels within a printing apparatus, the cleaning device comprising a flexible substrate sheet having a first side and a second side, with the first side coated with an exposed adhesive, said adhesive having a tack strength between about 0.0002 and about 0.12 pound force-square inch, and with the second side having laminated thereto a foam resin with an exposed surface to which exposed surface is laminated a generally lint-free cloth layer.

* * * * *